United States Patent [19]
Gomez

[11] Patent Number: 5,227,024
[45] Date of Patent: Jul. 13, 1993

[54] LOW DENSITY MATERIAL CONTAINING A VEGETABLE FILLER

[76] Inventor: Daniel Gomez, 8, allée du Pont Rouge, Mimizan, France, 40200

[21] Appl. No.: 865,688

[22] Filed: Apr. 8, 1992

Related U.S. Application Data

[63] Continuation of Ser. No. 397,428, Aug. 8, 1989, abandoned.

[30] Foreign Application Priority Data

Dec. 14, 1987 [FR] France .................................. 8717400

[51] Int. Cl.$^5$ ............................................. D21H 17/01
[52] U.S. Cl. .................................... 162/142; 162/147; 162/148; 162/149; 162/150
[58] Field of Search .............. 162/142, 150, 147, 148, 162/149, 176, 71

[56] References Cited
U.S. PATENT DOCUMENTS
4,011,130 3/1977 Woeden .............................. 162/176

*Primary Examiner*—W. Gary Jones
*Assistant Examiner*—Brenda Lamb
*Attorney, Agent, or Firm*—Jacobson, Price, Holman & Stern

[57] ABSTRACT

A process for reducing the density, increasing the bulk, the hand and the porosity of a sheet material containing fibers by use of a vegetable filler, wherein a pulverulant vegetable filler of density less than 500 kg/m$^3$ is introduced into the fibrous mass during the manufacture of the material. At least 95% by weight of the particles of the vegetable filler are less than 150 micrometers in size and at least 80% by weight of the particles of vegetable filler are greater than 10 micrometers in size. The process is particularly useful for obtaining paper and cardboard of low density with improved hand (or bulk) and porosity. It is also attractive since it reduces the cost prices and enhances the thermal and acoustic insulation properties.

5 Claims, No Drawings

LOW DENSITY MATERIAL CONTAINING A VEGETABLE FILLER

This is a continuation of application Ser. No. 07/397,428, filed Aug. 8, 1989 which was abandoned upon the filing hereof.

BACKGROUND OF THE INVENTION

The present invention relates to the use of a vegetable filler of low density and controlled particle size. It relates more particularly to the preparation of a composite sheet material, containing fibers, which is more porous and has a reduced density with an improved bulk by virtue of such a vegetable filler. It is of particular value in the field of the manufacture of fibrous sheets such as paper, board and other nonwovens.

It is conventional in papermaking to use mineral, organic or synthetic fillers or pigments. The most commonly used mineral fillers and pigments are talc, kaolin, natural and precipitated calcium carbonate or calcium carbonate originating from the operations for regenerating the black liquor extracted from the digestion of kraft pulps, magnesium carbonate, alumina hydrates, calcium sulfate, colloidal silica, barium sulfate, titanium dioxide, magnesium hydroxide and mixtures thereof.

The conventional fillers used in papermaking have variable equivalent spherical diameters, measured by means of the SEDIGRAPH device, but as a general rule all these fillers have particles with dimensions smaller than 100 micrometers, in particular smaller than 50 micrometers and especially smaller than 30 micrometers.

Thus 50% of the particles of the kaolin to be incorporated into the mass have a size of between 6 and 8 micrometers ($d_{50}$ = 6–8 micrometers) and 95% of the particles have a size of less than 50 micrometers ($d_{95}$ < 50 micrometers). The talc to be incorporated into the mass has a $d_{50}$ of between 8 and 10 micrometers and a $d_{95}$ of less than 50 micrometers and the calcium carbonate has a $d_{50}$ of between 7 and 9 micrometers and a $d_{95}$ of less than 25 micrometers.

The surface-coating pigments have a $d_{50}$ of between 1 and 3 micrometers and a $d_{95}$ of less than 10 micrometers. The organic pigments are much finer and have a $d_{50}$ of between 0.1 and 1 micrometer.

It is known, especially from EP-B-0 006 390, EP-B-0 050 316 and FR-A-2 578 870, that mineral fillers favor a lowering of the material cost and, depending on their nature, favor the opacity, in particular in the sector of printing-writing substrates and certain special types of paper. If the proportion of mineral fillers in the material is high compared with that of the cellulosic fibers, they can favor the dimensional stability, which is particularly desirable in bases for floor or wall covering; however, on the one hand the use of these mineral fillers has an adverse effect on the thickness of the material, and on the other hand the increase in the residual ash content also results in a substantial increase in the density of the material, which does not favor the cost per $m^2$.

The paper industry uses certain special fillers or pigments to increase the thickness of the sheet, for example diatomite or natural, calcined or activated diatomaceous earths, carbon or glass microspheres, calcium silicates and colloidal silicas, but these fillers or pigments are generally very expensive.

The incorporation of so-called mechanical cellulosic pulps, such as thermomechanical or chemicomechanical pulps, and, to a lesser extent, mercerized pulps and synthetic fibers, especially polyester, polyethylene and polypropylene fibers, also plays a part in improving the bulking (or body of paper or puffing out), but the use of these fibers demands substantial industrial means and only concerns very specific applications.

It is known that the possibility of using wood powder or flour as a filler, introduced into the mass or deposited on the surface by coating, in the manufacture of paper and board has already been indicated in the past.

It is known in particular that abstract no. 8739 of the journal ABSTRACT BULLETIN OF THE INSTITUTE OF PAPER CHEMISTRY, 48, (no. 8), page 938, (February 1978), U.S. Pat. No. 3,184,373 and German patent DE-C-415 675 provide for the incorporation of wood powder into the fibrous mass.

Abstract no. 8739 mentioned above recommends the use of a mixture of 70–95% by weight of cellulosic pulp (kraft fibers) and 30–5% by weight of wood flour for the manufacture of electrically insulating panels, these panels being said to be more absorbent towards oils and more resistant to surface discharges. The said document neither describes nor suggests the use of a vegetable filler having the particle size and density specific to the present invention.

U.S. Pat. No. 3,184,373 relates to the improvement in the retention of fillers in paper and board by means of a retention agent such as polyethyleneimine, melamine-formaldehyde resins and urea-formaldehyde resins, the said "fillers" being defined (see column 2, lines 3–34) as being solid or liquid substances and comprising, in particular, mineral paper fillers themselves, metal powders, thermosetting resin powders thermoplastic resins, binders, flocculants and wood powder (see column 2, line 27). The particle size of the said "fillers" is said to be between 60 mesh and 2000 mesh (see column 1, lines 70–71). However, U.S. Pat. No. 3,184,373 does not give any Examples illustrating the use of the said wood powder introduced into the mass; furthermore, it neither describes nor suggests the particle size (particle dimensions of between 10 and 150 micrometers) and the density (less than 500 $kg/m^3$) specific to the vegetable filler according to the invention.

German patent DE-C-415 675 proposes a sizing process in which (i) a colloidal dispersion of a submicron substance (i.e. a substance with a particle size of less than 1 micrometer) containing cellulose and originating from the grinding of wood or straw, and then (ii) a flocculant, are incorporated into an aqueous suspension of fibers. The said submicron substance, which therefore has a particle size well below that of the vegetable filler according to the invention, fulfils a totally different role from that of the said vegetable filler; in fact, the said submicron substance is presented in German patent document C-415 675 as reducing the porosity of the resulting paper by blocking and/or filling the pores in the fibrous web, whereas an increase in the porosity is sought according to the invention.

Techniques of covering (on a non-fibrous substrate) or surface sizing (on a fibrous sheet substrate such as paper and board) are known from other sources, especially from Belgian patent BE-A-425 432, published PCT International application WO 86/05195 and British patent GB-A-1 464 381, wherein a substrate is coated with a composition containing wood powder. It so happens that these techniques neither describe nor suggest the incorporation, into the fibrous mass, of the vegetable filler of specific particle size and density according to the invention.

Products which are capable of being incorporated into paper and board, contain cellulose and are obtained by the physicochemical treatment of wood chips or cellulosic fibers are also known, especially from abstract no. 1523 of the journal ABSTRACT BULLETIN OF THE INSTITUTE OF PAPER CHEMISTRY, 58 (no. 2), page 184 (August 1987), abstract no. 7191, ibidem 55 (no. 6), page 754, (December 1984), and published French patent application FR-A-2 612 828 (which was made public on Sep. 30, 1988, after the priority date of the present invention). The composition of the said products containing cellulose is different from that of the vegetable or fibrous source from which they are derived. In fact, the physical and chemical treatments to which the said source has been subjected do not preserve the integrity of the components of the said source.

More precisely, abstract no. 1523 mentioned above describes the preparation of cellulose in the form of micronized particles (having a size of between 5 and 75 micrometers and a degree of crystallinity greater than 65%) by the hydrolytic treatment of cellulosic pulps. The cellulose obtained in this way differs from the composition of the vegetable filler according to the invention in respect of the nature of the components of the latter.

Abstract no. 7191 mentioned above describes the use of microfibrillated cellulose for the production of coatings for covering. Here again the microfibrils of cellulose differ in their structure and composition from the vegetable filler according to the invention.

French patent document FR-A-2 612 828 is deceptive in the sense that its claim 1, as published, refers to the use of wood particles in the preparation of fibrous sheets, whereas what is actually involved is the use of an extract, in pulverulent form, obtained by treating wood powder, the said treatment comprising the following steps in particular (see descriptive part of the said document from page 1, line 28, to page 2, line 12): (i) impregnation of the wood powder with an appropriate liquid chemical agent (sic), (ii) flash autolysis (or flash autohydrolysis) of the impregnated wood powder under a pressure greater than or equal to 30 bar, at a temperature greater than or equal to 230° C., for at least 90 seconds, followed by a rapid (sudden) release of pressure, (iii) washing of the resulting product with water or a water/dioxane mixture in order to remove the hemicelluloses and most of the lignin, fatty acids and resin acids, and then (iv) drying of the extracted pulverulent product containing water-insoluble materials and devoid of water-soluble materials.

The present invention differs from the teaching of the said abstracts no. 1523 and no. 7191 and the said French patent document FR-A-2 612 828 by the fact that the vegetable filler, which it is recommended to use in the mass, has preserved substantially all the components of the vegetable source; in the vegetable filler according to the invention, only the water content and the content of volatile substances (such as the low-boiling essential oils) have been affected by comparison with the starting vegetable source. Thus, if the vegetable source is wood, practically all the components of the wood, as described in the work by FENGEL et al., WOOD CHEMISTRY ULTRASTRUCTURE REACTIONS, pages 26–33, published by D. GRUYTER (1984), which is incorporated here by way of reference, will be found in the vegetable filler.

Referring to the teaching of the nearest prior art, which consists of abstract no. 8739 of the journal ABSTRACT BULLETIN OF THE INSTITUTE OF PAPER CHEMISTRY, 48, (no. 8), page 938, (February 1978), U.S. Pat. No. 3,184,373 and German patent DE- C-415 675 mentioned above, it should be pointed out that the use of wood flour or powder has never worked on the industrial scale according to precise specifications (i) for the density and particle size of the vegetable filler, and (ii) for the purpose of obtaining, by a papermaking technique, sheets of fibrous materials which are more economical and have a lower density, with a high porosity and a high bulk.

BRIEF SUMMARY OF THE INVENTION

It is an object of the present invention to provide a novel technical solution for overcoming the above-mentioned difficulties. This solution utilizes an abundant and renewable vegetable raw material, namely wood and principally waste wood, as well as other vegetable waste such as, in particular, waste from cereal production, especially maize cobs. It is this vegetable raw material which will be used to manufacture the low-density vegetable fillers having the desired particle size so that they can be incorporated into the mass, either direct like any other conventional filler used in papermaking, or, preferably, in the form of a previously flocculated mixture of filler and binder.

Thus, according to one of its aspects, the present invention relates to the manufacture of a sheet material by a papermaking technique, the material containing a vegetable filler of low density and controlled particle size, making it possible to reduce the density and increase the thickness, bulk and porosity of this material.

Furthermore, according to the invention, the reduction in density and the increase in thickness of the material impart specific and beneficial properties, such as opacity and acoustic thermal and electrical insulation, especially in the case of fibrous sheets.

In addition, according to the invention, the use of the above-mentioned vegetable filler favors the rate of drainage during the manufacture of the sheet material and hence favors productivity. The present process also has the advantage of lowering costs.

According to the invention, it is recommended to use a vegetable filler of specific particle size and density for the manufacture of fibrous sheet materials by a papermaking technique, utilizing a technical solution which differs from the teaching of the prior art by the choice of the said vegetable filler of specific density and particle size.

In this technical solution, the vegetable filler of specific density and particle size is introduced into the mass.

As a variant, it is recommended to replace part of the fibers (expensive) of the fibrous sheet material with the said vegetable filler of specific density and particle size (less expensive).

According to the invention, a novel technical solution is proposed which makes it possible to reduce the density, increase the porosity, increase the bulk and lower the manufacturing costs of paper and board.

This novel technical solution also makes it possible (i) to increase the thickness of the fibrous sheet material on account of the reduction in density, (ii) to improve the bulking of the said material, and (iii) to improve drainage on the paper machine during the formation of the said material.

One of the fundamental characteristics of the process according to the invention is the use of a pulverulent vegetable filler having a density of less than 500 kg/m$^3$ and preferably of less than 300 kg/m$^3$, on the one hand, and a $d_{95}$ of less than 150 micrometers and a $d_{80}$ of more than 10 micrometers [i.e. at least 95% of the particles of vegetable filler (percentage expressed by weight) pass through a square-mesh sieve (made especially of stainless steel) with a mesh size of 150×150 micrometers, and at least 80% of the particles do not pass through a square-mesh sieve (made especially of stainless steel) with a mesh size of 10×10 micrometers, on the other hand.

According to a first aspect of the invention, a process is therefore provided for the preparation of a fibrous sheet material by a papermaking technique, in which process, which comprises introducing a pulverulent vegetable filler into an aqueous dispersion containing fibers, the vegetable filler is micronized, has a density of less than 500 kg/m$^3$ and has a particle size such that (i) at least 95% by weight of the particles of the said vegetable filler have dimensions smaller than 150 micrometers, and (ii) at least 80% by weight of the particles of the vegetable filler have dimensions larger than 10 micrometers.

According to a second aspect of the invention, a process is provided for reducing the density of a fibrous sheet material by means of a vegetable filler, wherein a pulverulent vegetable filler which has a density of less than 500 kg/m$^3$ and a particle size such that (i) at least 95% by weight of the particles of the said vegetable filler have dimensions smaller than 150 micrometers, and (ii) at least 80% by weight of the particles of the said vegetable filler have dimensions larger than 10 micrometers, is introduced into the aqueous suspension containing fibers during the manufacture of the said material.

In other words, through the use of the said vegetable filler, the invention provides a process for increasing the thickness, bulk and porosity, on the one hand, and reducing the density of the material, on the other. Using the vegetable filler has a very favorable effect on drainage and has the advantage of lowering the production costs.

DETAILED DESCRIPTION OF THE INVENTION

Any species of wood can be used to obtain the vegetable filler according to the invention, such as wood from coniferous trees like fir, pine and spruce, and wood from deciduous trees such as birch, beech, hornbeam and chestnut. These woods can originate either from clearance felling or from tree stubbing, after conversion to chips or strips/platelets by the methods well known in the paper industry for the manufacture of chemical and chemicomechanical pulps. For essentially economic reasons, these vegetable fillers will originate from waste produced in the wood cutting and planing industry, such as fresh and dry sawdust, planing chips, bark and machining debris produced in parquetry, joinery and cabinet making.

The vegetable filler can also be obtained from waste vegetable material produced in forestry, such as tree stumps, unutilized branches of small diameter, remnants and the top ends of tree trunks, and also from waste produced in cereal harvesting, such as maize cobs.

As the various vegetable sources mentioned above have different physical, chemical and morphological properties, the properties which they impart to the final fibrous sheet material can vary, as regards the density, bulk and porosity, according to the species used. Nevertheless, a significant reduction in the density and an increase in the bulk and porosity are obtained in all cases.

It is important for the micronized vegetable filler to be in the form of particles having mean dimensions smaller than 150 micrometers ($d_{95} < 150$ micrometers) and greater than 10 micrometers ($d_{80} > 10$ micrometers). In fact, if the particles of micronized vegetable filler have mean dimensions equal to or larger than 150 micrometers, the resulting fibrous sheet product exhibits uniformity defects, especially formation defects; if the particles of micronized vegetable filler have mean dimensions smaller than or equal to 10 micrometers, the resulting fibrous sheet product is distinctly less porous, as taught by German patent DE-C-415 675 mentioned above. As indicated earlier, the particle size of the micronized vegetable filler will be such that $d_{95} < 150$ micrometers (preferably $d_{95} < 100$ micrometers) and $d_{80} > 10$ micrometers.

Furthermore, it is also important, as regards the properties required for the final sheet product, for the density of the micronized vegetable filler to be less than 500 kg/m$^3$ and preferably less than 300 kg/m$^3$.

To obtain the vegetable filler according to the invention, it is also important for the vegetable source, which is subjected to a grinding-micronization operation, to have a particle size less than or equal to 5 mm and a residual moisture content of less than 20% prior to the grinding-micronization operation.

In the process of the invention, the vegetable waste is subjected to a grinding-micronization operation in order to produce the vegetable fillers with the particle dimensions required for the subject of the invention. This result is achieved by a specific grinding-micronization technique (vegetable source with a particle size less than or equal to 5 mm and a residual moisture content of less than 20%), especially by means of a disk-type grinder-selector with impact beaters, which makes it possible, through intense high-speed collisions and with changes in pressure, to cause the gradual disintegration of the vegetable source until the desired fineness and density are obtained. Advantageously, the residual moisture content of the vegetable source to be subjected to the grinding-micronization operation will be less than or equal to 15%.

Thus, if the vegetable source (or raw material) takes the form of strips/platelets, planing chips, machining debris, branches etc., it is first necessary to shred it and, if appropriate, dry it, before the grinding-micronization operation, in order to obtain a fineness less than or equal to 5 mm and a residual moisture content of less than 20%.

In paper applications, the vegetable fillers according to the invention will therefore have a $d_{95}$ of less than 150 micrometers (i.e. at least 95% of the particles of vegetable filler pass through a square-mesh sieve of 150 micrometers by 150 micrometers), preferably a $d_{95}$ of less than 100 micrometers. These vegetable fillers will be associated with a natural or customary organic binder, fibers and various additives conventionally used for the preparation of fibrous sheets.

The weight ratio pulverulent vegetable filler/fibers according to the invention will generally be within the range from 1/100 to 6/1. For the manufacture of wrapping paper, it will be advantageous to use a weight ratio vegetable filler/fibers within the range from 1/100 to 2/10 (and preferably from 1/100 to 1/10), for the manufacture of printing-writing substrates a weight ratio within the range from 2/10 to 5/10 (and preferably from 2.5/10 to 3.5/10), for the manufacture of cardboard a weight ratio within the range from 1/10 to 5/10, for the manufacture of paper for impregnation a weight ratio within the range from 1.5/10 to 5/10 (and preferably from 2/10 to 3/10) and for the manufacture of special types of paper a weight ratio within the range from 6/100 to 6/1 (and preferably from 3/10 to 8/10).

The fibers which can be used for these various applications are, in particular, natural or synthetic organic fibers such as cellulosic fibers, polyamide fibers, polyester fibers, polyalkylene fibers and polyacrylate fibers, mineral fibers such as glass fibers, ceramic fibers, acicular gypsum fibers, carbon fibers and rock wool, and regenerated cellulose fibers. These fibers can be used on their own or in a mixture. The fibers most commonly used will be cellulosic fibers originating from kraft or bisulfite chemical pulps, mechanical pulps, thermomechanical pulps or chemicothermomechanical pulps. These pulps, produced from species of conifercus or deciduous trees, can be unbleached, semi-bleached or bleached.

It is also possible to use so-called recovered cellulosic pulps originating from waste paper (such as printing-writing substrates, newspapers, cardboard boxes, wrapping paper, magazines and the like), by themselves or in association with noble cellulosic fibers.

In the process of the invention, the vegetable fillers of controlled particle size can be associated with other organic or synthetic mineral fillers or mixtures thereof; these customary or special fillers or pigments used in papermaking are those which have already been mentioned above.

In practice, according to the invention, the vegetable filler will on the one hand replace part of the essential ingredient of the material, namely the fibers in the paper sector, and on the other hand be able to replace all or only a fraction of the customary filler, especially mineral filler, in the material.

In paper manufacture, it can be advantageous to incorporate, into the fibrous mass containing the vegetable fillers, one or more agents conventionally used in papermaking for increasing the dry strength properties of the sheet, for example native starches or starches modified by a chemical, enzymatic or thermal method, dextrins, polyvinyl alcohols, casein, animal size, vegetable proteins, cellulose esters such as carboxymethylcellulose, alginates, dispersions of synthetic polyamines, carboxylated or non-carboxylated styrenebutadiene latices, acrylic latices, styrene-acrylic latices, vinyl acetate latices, neoprene latices, acrylonitrile latices, vinyl chloride latices and mixtures thereof.

The amount of these natural or synthetic organic polymers which act as a mass or surface binder can vary within very wide limits, according to the applications, but as a general rule it is between 0.1 and 10 parts by dry weight of binder per 100 parts by weight of fibers for the conventional applications and especially for wrapping paper and cardboard and printing-writing paper, but it can be much higher, i.e. between 10 and 50 parts by weight and preferably between 10 and 30 parts by dry weight per 100 parts by weight of the fibrous sheet for special applications such as bases for making composites, for coating and for coverings.

It may also be necessary to improve the wet strength properties of the fibrous sheets according to the invention, especially with additives customarily used in papermaking, such as urea-formaldehyde and melamine-formaldehyde resins, glyoxal, polyalkyleneamines, especially those which are cationic and crosslinked, and condensation products of melamine-formaldehyde and aminocaproic acid.

In addition to fibers and vegetable fillers, by themselves or combined with other fillers or pigments, in the presence or absence of natural or synthetic organic polymers for improving the dry and wet properties, it is also possible to use:

sizes used in the paper industry for reducing the sensitivity of the paper to water, such as modified rosins, paraffin emulsions and dimeric alkylketens;

pH regulators such as aluminum sulfate and sulfuric acid; and anionic and/or cationic retention agents for reducing the material losses during the formation of the sheet.

The following may be mentioned in particular: polyethyleneimine, polyamidoamine and polyalkylamine resins, especially those which are crosslinked, polyacrylamide resins, especially modified polyacrylamide resins, and quaternary ammonium compounds.

Other customary additives used in papermaking are also possible:

antifoams;

fluorescent whiteners;

colorants or toners; and fungicides and/or bactericides.

According to another aspect of the invention, these vegetable fillers can first be subjected to a chemical treatment for giving them appearance properties and physical or chemical characteristics which they do not have in the natural state, before they are introduced into the mass. Examples which may be mentioned are treatments which have an effect on modifying the color of the wood particles, fungicidal, bactericidal and fireproofing treatments or treatments which favor a reduction in the sensitivity of the vegetable material to water.

A sheet containing the vegetable fillers according to the invention can be produced on a conventional paper or board machine with one or more flat, inclined or vertical beds which may or may not be equipped with single-wire or twin-wire formers of circular shape. This sheet can be of the single-ply type or of the multi-ply type with plies of identical or different compositions, as is the case for board in particular.

The fibrous sheet according to the invention, containing vegetable fillers, can also be subjected to different surface treatments conventionally used in papermaking, on or off the paper machine, with the surface sizing, impregnating, coating and surface coating means known to paper manufacturers and processors.

The vegetable filler according to the invention can be used in the mass and on the surface during the manufacture of the fibrous sheet. It is introduced into the mass either direct, like any other conventional paper filler, or, preferably, in the form of a mixture of vegetable filler and organic binder which has first been homogenized and then flocculated (especially by means of a multistage flocculator) before being incorporated into the aqueous suspension of fibers upstream of the headbox. If necessary, it is applied to the surface of the fibrous sheet by customary methods of treating the surfaces of paper and board, especially by coating, surface coating and/or impregnation, in accordance with the prior art mentioned above (especially Belgian patent BE-A-425 432, International patent application WO 86/05 195 and British patent GB-A-1 464 381).

The vegetable filler according to the invention can be used direct in the field of the preparation of coatings and paints. The essential aim is to reduce the density of the material. The secondary aims, which are also of value, are to increase the thickness of the material and to improve the bulking of the material and the beneficial properties in terms of improving the opacity and the acoustic, thermal and electrical insulation.

The best mode for carrying out the invention for paper and cardboard applications has been given below Stage 1

The cellulosic fibers in aqueous suspension are refined in conventional manner to a Schoepper-Riegler freeness of between 15 and 70 degrees, according to the applications, at a variable concentration of between 20 and 350 g/l, in particular of between 20 and 60 g/l, with the aid of standard conical or twin-disk refiners, or especially of between 250 and 350 g/l with special refiners for so-called high-consistency refining used for the manufacture of wrapping substrates. If necessary, other types of synthetic or mineral fibers, by themselves or in association, can be introduced at this stage. In particular, glass fibers are useful for improving the dimensional stability of the sheet.

At this stage, the fibrous composition can be invariable if it is used to manufacture a single-ply sheet, or variable if it is used to manufacture a multi-ply sheet, as is the case for board in particular.

Stage 2

The vegetable fillers are produced from vegetable waste and mainly from waste produced in the timber industry and forestry. This waste will generally be subjected to an initial shredding-grinding operation, when it is the form of large pieces, to give a vegetable raw material having a particle size such that $d_{95} < 5$ mm before the final grinding-micronization operation. This is the case in general for machining debris, sawing trimmings, planing chips, small branches, tree stumps, bark and maize cobs. The initial shredding-grinding treatment is not necessary when the vegetable waste is sawdust; when the vegetable material is wet (the average moisture content is generally of the order of 30%), it has to be dried to a residual moisture content less than or equal to 15% before the grinding-micronization operation in order to produce vegetable fillers with the particle size and density required for the applications according to the invention.

These vegetable fillers will have a $d_{95}$ of less than 150 micrometers and especially a $d_{95} < 100$ micrometers, i.e. at least 95% of the wood particles will pass through a square-mesh sieve of 150 micrometers by 150 micrometers or, respectively, a square-mesh sieve of $100 \times 100$ micrometers. These vegetable fillers can originate either from a grinding-micronization unit on the paper or board production site, or from an external unit.

The vegetable fillers are easily transported to the storage unit by mechanical means involving conveyor belts or screw conveyors, or by pneumatic means, before they are used on their production site by an integrated plant or before they are supplied to external customers in bags, loose or semi-loose.

Stage 3

The vegetable fillers of the desired particle size can be introduced direct into the mass, like a conventional paper filler. The amount of vegetable fillers can vary from 1 to 50 parts by weight and especially from 1 to 30 parts by weight per 100 parts by weight of fibers in the case of conventional wrapping or printing-writing paper or board, but it can also vary from 60 to 600 parts by weight of vegetable fillers per 100 parts by weight of fibers in the case of special applications such as substrate for coating and impregnation for construction materials and wall and floor coverings.

These vegetable fillers can also be introduced into the mass with prior mixing, homogenization and, if appropriate, flocculation of the filler with an organic binder.

This operation takes place continuously in a multistage flocculator, making it possible to control the homogenization, concentration and dilution conditions to give the diameter required for the filler-binder flocs before they are incorporated into the head circuits of the paper or board machine.

Stage 4

After the fibers and vegetable fillers have been mixed, it is then possible to introduce into the mass the other conventional additives and the adjuvants required in accordance with the desired objectives.

The weight of the sheet of paper or board can vary between 20 and 500 g/m², but for special applications this weight can be much greater, for example 600 to 1000 g/m² for certain millboards and coverings.

This technology can advantageously be exploited for the manufacture of paper and board and especially wrapping paper, paper for corrugated board, paper and board for graphic purposes, kraft wrapping paper, pressboard, board for packaging liquids, kraft box-lining paper, newsprint paper, printing-writing substrates, substrates for impregnation with resins, paper and board for industrial and special purposes, paper for domestic purposes, substrates for coating, and coverings.

The incorporation of the micronized vegetable filler according to the process of the invention favors drainage on the paper or board machine and thereby favors productivity. The improvement in drainage is very substantial for heavy sheet materials.

Further advantages and characteristics of the invention will be understood more clearly from the following description of Examples, which do not imply a limitation but are given by way of illustration, showing the use of these vegetable fillers in the paper sector in particular.

EXAMPLES 1-3

Preparation of kraft paper

To assess the properties imparted by the vegetable fillers according to the invention, handsheet samples weighing about 200 g/m² were prepared for comparison purposes. Example 1 concerns a paper of conventional formulation according to the prior art and Examples 2 and 3 concern papers obtained according to the invention. The amounts of the various ingredients (expressed in parts by weight) and the operating procedures are collated in Table I below. The results obtained are given in Table II below.

Table II shows that the use of the vegetable filler according to the invention gives the fibrous sheets good overall mechanical strength properties, more particularly when the vegetable filler has been preflocculated with a binder. The products of Examples 2 and 3 according to the invention show a 16% increase in thickness and a 12 to 15% reduction in density compared with the product of Example 1 obtained according to a conventional formulation of the prior art. The products of Examples 2 and 3 are also found to have improved sizing compared with the product of Example 1. The sheets of Examples 2 and 3, obtained with the vegetable filler, are more porous and drain more easily on the handsheet wire.

TABLE I

| Composition | Ex. 1 * | Ex. 2 ** | Ex. 3 ** |
|---|---|---|---|
| Softwood kraft pulp (a) | 100 | 83 | 83 |
| (freeness °SR) | (23) | (23) | (23) |
| Talc (b) | 25–30 (to give 15% to 18% of residual fillers) | 0 | 0 |
| Vegetable filler (c) | 0 | 17 (d) | 17 (e) |
| Size (f) | 0.3 | 0.3 | 0.3 |
| Alum | (g) | (g) | (g) |
| Cationic starch | 0.2 | 0.2 | 0.2 |

Notes
* conventional formulation according to the prior art;
** Example according to the invention;
(a) origin: maritime pine;
(b) particle size $d_{50}$ = 8–10 micrometers;
(c) particle size $d_{95}$ < 70 micrometers and $d_{80}$ > 10 micrometers, density < 300 kg/m$^3$, origin: maritime pine;
(d) incorporation into the mass;
(e) incorporation into the mass after mixing beforehand with native starch (0.3 part) and flocculation with polyethyleneimine (0.4 part);
(f) rosin emulsion;
(g) amount sufficient for pH 4.5–4.7.

TABLE II

| Properties | Ex. 1 * | Ex. 2 ** | Ex. 3 ** |
|---|---|---|---|
| Weight (g/m$^2$) | 200 | 201 | 198 |
| Thickness (a) | 269 | 313 | 312 |
| Density (kg/m$^3$) | 743 | 642 | 634 |
| Bendtsen permeability to air (ml/min) | 168 | 340 | 354 |
| Tensile strength, average MD/CD (kN/m) | 11 | 10.6 | 11.1 |
| Elongation (%), average MD/CD | 3.2 | 2.8 | 3.2 |
| Energy at break (J/m$^2$) | 133 | 121 | 130 |
| Bursting strength (kPa) | 798 | 772 | 885 |
| Sizing (Cobb) at 60 s (g/m$^2$) | 33 | 21 | 20.5 |
| Residual fillers (%) | 16.5 | 0 | 0 |

Notes
* conventional formulation according to the prior art;
** Example according to the invention;
(a) in micrometers.

EXAMPLES 4–5

Preparation of kraft paper for postal bags

For comparison purposes, two samples of kraft paper weighing 120 g/m$^2$, intended for the manufacture of postal bags, were prepared according to the amounts (expressed in parts by weight) and operating procedures given in Table III below, the product of Example 4 being a paper of a conventional formulation according to the prior art and the product of Example 5 being a paper containing a vegetable filler according to the invention, coated with native starch. The results obtained, which are collated in Table IV below, show that the incorporation of the vegetable filler according to the invention is very favorable in terms of the thickness (8% increase for Example 5 compared with the control of Example 4).

TABLE III

| Composition | Ex. 4 * | Ex. 5 ** |
|---|---|---|
| Basic mixture (a) | | |
| 1) Lightened softwood kraft pulp | 65 | 67 |
| 2) Waste unbleached kraft paper | 20 | 20 |
| 3) Semibleached chemical pulp | 15 | 0 |
| 4) Vegetable filler (based on maritime pine) (b) | 0 | 13 |
| Additives (c) | | |
| Native starch (d) | 0 | 0.8 |
| Cationic flocculant (e) | 0 | 0.03 |
| Talc | 23 | 20 |
| Size (f) | 0.6 | 0.6 |
| Cationic starch | 0.25 | 0.25 |
| Toner | 0.05 | 0.05 |
| Alum | (g) | (g) |

Notes
* conventional formulation according to the prior art;
** Example according to the invention;
(a) amounts introduced, expressed in parts by weight;
(b) particle size; $d_{95}$ < 150 micrometers, $d_{80}$ > 10 micrometers, moisture content < 15% before introduction of the basic mixture into the aqueous suspension of fibers, density < 300 kg/m$^3$;
(c) additives introduced into the mass [amounts expressed in parts by weight per 100 parts of basic mixture (1 + 2 + 3 + 4 = 100)];
(d) for coating the vegetable filler;
(e) polyethyleneimine;
(f) rosin emulsion;
(g) amount sufficient for pH 4.5–5.0.

TABLE IV

| Properties | Ex. 4 * | Ex. 5 ** |
|---|---|---|
| Weight (g/m$^2$) | 87 | 87 |
| Thickness (a) | 151 | 163 |
| Bulk (cm$^3$/g) | 1.74 | 1.87 |
| Bendtsen porosity (ml/min) | 2000 | 2300 |
| Breaking length (m) | 4580 | 4620 |
| Burst factor (kPa · m$^2$/g) | 3.22 | 3.48 |
| Tear factor (mN · m$^2$/g) | 1280 | 1210 |
| Sizing (Cobb) at 60 s (g/m$^2$) | | |
| recto | 18.9 | 17.8 |
| verso | 21.7 | 20.3 |
| Whiteness (photovolt) | 36 | 36 |
| Retention (%) | | |
| fibers | 98 | 98 |
| vegetable filler | — | 80 |
| talc | 59 | 65 |

Notes
* conventional formulation according to the prior art;
** Example according to the invention;
(a) in micrometers.

OBJECTIVE

One of the essential properties of kraft paper for postal bags, apart from the customary mechanical strength properties and the appearance of a friction-glazed kraft paper for this type of use (tear factor, burst factor, tensile strength, uniformity and level of gloss) is the bulking, which plays a part in the machinability of the paper converted on modern equipment for the production of envelope-bags, and also in the marketing impact.

RESULTS

The introduction of vegetable material coated with native starch favors the thickness of the sheet: an increase of about 8% without modifying the mechanical characteristics of the paper. The good retention of the vegetable filler according to the invention should be noted.

Also notable are the good sizing performance characteristics and the substantial increase in thickness (the thickness is the converse of the bulk), this having a very favorable effect on the stiffness, which varies as the cube of the thickness.

ECONOMIC ADVANTAGES

The reduction in the cost of the product according to Example 5 compared with the control of Example 4 is of the order of 6%, without allowing for the increase in productivity due to better drainage.

EXAMPLES 6-8

Preparation of paper for coating with plastic

Sheets of paper weighing about 210 g/m² were prepared according to the amounts of ingredients (expressed in parts by weight) and operating procedures in Table V below. The results obtained have been collated in Table VI below.

These results show that, in this specific case, the products of Examples 7 and 8, which contain a vegetable filler according to the invention, are 30 to 40% less dense than the product of Example 6 obtained according to a formulation of the prior art.

The compositions of Examples 7 and 8 are very economical (sawmill waste and tree stumps) with less synthetic binder, which explains the slightly inferior mechanical strength properties, but these physical characteristics are well in excess of the conventional requirements for bases to be coated with plastics, intended for the manufacture of building materials.

The heat resistance of the sheets with vegetable fillers according to Examples 7 and 8 is also found to be good. The substantial increase in thickness and the reduction in density affect the acoustic attenuation provided by the material or covering.

TABLE V

| Composition | Ex. 6 * | Ex. 7 ** | Ex. 8 ** |
|---|---|---|---|
| Unbleached softwood kraft pulp (a) (freeness °SR) | 100 (20-22) | 50 (20-22) | 50 (20-22) |
| Glass fibers | 6 | 6 | 6 |
| Talc (b) | 45 to 55 (for 30-35% of residual fillers) | 0 | 0 |
| Vegetable filler (c) | 0 | 50 (d) | 50 (e) |
| Acrylic binder | 10 | 8 | 8 |
| Starch binder | 0 | 1 | 1 |
| Cationic polyamide | 0 | 1 | 1 |
| Cationic starch | 0 | 0.2 | 0.2 |
| Size (f) | 1.2 | 1.2 | 1.2 |
| Alum | (g) | (g) | (g) |

Notes
* conventional formulation according to the prior art;
** Example according to the invention;
(a) origin: maritime pine;
(b) particle size d₅₀ = 8-10 micrometers;
(c) particle size d₉₅ < 100 micrometers and d₈₀ > 10 micrometers, moisture content < 15% before introduction into the aqueous suspension of fibers (for a mixture of sawmill waste and maritime pine tree stump in the weight ratio 80-20), density < 300 kg/m³;
(d) incorporation into the mass;
(e) incorporation into the mass after prior mixing with native starch (0.3 part) and flocculation with polyethyleneimine;
(f) rosin emulsion;
(g) amount sufficient for pH 6.0-6.5.

TABLE VI

| Properties | Ex. 6 * | Ex. 7 ** | Ex. 8 ** |
|---|---|---|---|
| Weight (g/m²) | 215 | 208 | 207 |
| Thickness (a) | 270 | 398 | 395 |
| Density (kg/m³) | 796 | 522 | 524 |
| Bendtsen permeability to air (ml/min) | 320 | 1550 | 1520 |

TABLE VI-continued

| Properties | Ex. 6 * | Ex. 7 ** | Ex. 8 ** |
|---|---|---|---|
| Tensile strength, average MD/CD (kN/m) | 7.95 | 6.22 | 6.98 |
| Breaking energy (J/m²) | 99 | 78 | 87 |
| Bursting strength (kPa) | 570 | 539 | 565 |
| Sizing (Cobb) at 60 s (g/m²) | 20 | 18.5 | 18.5 |
| Residual fillers (%) | 32 | 0 | 0 |
| Dimensional stability | | | |
| oven drying (105° C., 1 h) | 0.7% (b) | 0% | 0% |
| soaking in water (1 h) | 0.6 | 0.6 | 0.6 |

Notes
* conventional formulation according to the prior art;
** Example according to the invention;
(a) in micrometers;
(b) shrinkage.

EXAMPLES 9-10

Preparation of featherweight kraft board

Examples 9 and 10 below illustrate the advantages of micronized vegetable filler according to the invention (cf. Example 10 compared with the control of Example 9), used in a fibrous composition of unbleached kraft pulp and chemicomechanical pulp for the manufacture of multi-ply boards (especially so-called wood board and gray board).

It is found that replacing about 10% of chemicomechanical pulp (abbreviated to "CTMP") with micronized vegetable filler coated with native starch does not affect the mechanical performance characteristics of the final sheet product, in particular the stiffness, for an equivalent or slightly greater bulk. The material obtained according to Example 10 of the invention has a greater porosity and better drainage than the control of Example 9. The improvement in drainage represents a substantial advantage in terms of productivity; overall, the composition of Example 10 is 5% more economical than that of the control of Example 9.

The procedures for obtaining the boards of Examples 9 and 10 are shown in Table VII below and the properties of these boards are collated in Table VIII below.

TABLE VII

| Composition | Ex. 9 * | Ex. 10 ** |
|---|---|---|
| Basic mixture (a) | | |
| 1) Unbleached softwood kraft pulp refined to 20° SR | 50 | 50 |
| 2) CTMP | 50 | 39 |
| 3) Vegetable filler (based on maritime pine) (b) | 0 | 11 |
| Additives (c) | | |
| Native starch (d) | 0 | 0.7 |
| Cationic flocculant (e) | 0 | 0.02 |
| Talc | 35 | 35 |
| Size (f) | 0.6 | 0.6 |
| Alum | (g) | (g) |

Notes
* conventional formulation according to the prior art;
** Example according to the invention;
(a) amounts introduced, expressed in parts by weight;
(b) particle size: d₉₅ < 100 micrometers, d₈₀ > 10 micrometers, moisture content < 15% before introduction of the basic mixture into the aqueous suspension of fibers, density < 300 kg/m³; the vegetable filler is a mixture obtained from sawdust and planing chips of maritime pine;
(c) additives introduced into the masss [amounts expressed in parts by weight per 100 parts of basic mixture (1 + 2 + 3 = 100)];
(d) for coating the vegetable filler;
(e) polyethyleneimine;
(f) rosin emulsion;
(g) amount sufficient for pH 4.5-5.0.

TABLE VIII

| Properties | Ex. 9 * | Ex. 10 ** |
|---|---|---|
| Weight (g/m$^2$) | 252 | 254 |
| Thickness (a) | 455 | 472 |
| Bulk (cm$^3$/g) | 1.80 | 1.86 |
| Bendtsen porosity (ml/min) | 680 | 1075 |
| Breaking length (m) | 3120 | 3090 |
| Burst factor (kPa · m$^2$/g) | 1.92 | 1.89 |
| Tear factor (mN · m$^2$/g) | 1080 | 1075 |
| Sizing (Cobb) at 60 s (g/m$^2$) | | |
| recto | 20.2 | 19.6 |
| verso | 20.4 | 18.6 |
| Whiteness (photovolt) | 44 | 46 |
| Buchel stiffness (mN) | 145 | 165 |
| Retention (%) | | |
| fibers | 97.5 | 98.0 |
| vegetable filler | — | 88.0 |
| talc | 65.0 | 70.0 |

Notes
* conventional formulation according to the prior art;
** Example according to the invention;
(a) in micrometers.

EXAMPLES 11-12

Preparation of substrate for impregnation

Substrates for impregnation with phenolic resin, intended for the manufacture of laminated panels, were prepared, the product of Example 11 being obtained according to a conventional formulation of the prior art and the product of Example 12 being obtained with a vegetable filler according to the invention. The amounts of the ingredients (expressed in parts by weight) and the operating procedures have been collated in Table IX below. The results of the tests are given in Table X below.

Table X shows that the product of Example 12 according to the invention is 30% thicker and 21% less dense than the product of Example 11. This situation is particularly advantageous in that it enables the number of sheets forming the inner cores of laminated panels to be reduced.

TABLE IX

| Composition | Ex. 11 * | Ex. 12 ** |
|---|---|---|
| Softwood kraft pulp (maritime pine) | 40 | 40 |
| Eucalyptus kraft pulp | 60 | 20 |
| Freeness (°SR) | 22 | 22 |
| Vegetable fillers $d_{98} < 70$ micrometers | 0 | 40 |
| Antifoam | 0.1 | 0.1 |

Notes
* conventional formulation according to the prior art;
** Example according to the invention.

TABLE X

| Properties | Ex. 11 * | Ex. 12 ** |
|---|---|---|
| Weight (g/m$^2$) | 180 | 182 |
| Thickness (micrometers) | 295 | 382 |
| Bulk (cm$^3$/g) | 1.64 | 2.1 |
| Density (kg/m$^3$) | 610 | 476 |
| Porosity (s) | 14–18 | 10–12 |
| Capillary rise in 10 minutes (mm) | 40 to 50 | 40 to 50 |
| Dry tensile strength, average MD/CD (kN/m) | 6.1 | 5.8 |
| Wet tensile strength (MD) | 0.6 | 0.5 |

Notes
* conventional formulation according to the prior art;
** Example according to the invention.

EXAMPLE 13

A base intended for an industrial composite is coated with a composition comprising 100 parts by dry weight of the hot-melt Mobil EF 78 BE and 20 parts by dry weight of vegetable filler (particle size $d_{95} < 50$ micrometers, $d_{80} < 10$ micrometers, moisture content less than 15% before introduction into the aqueous suspension of fiber), the said vegetable filler being introduced after the hot-melt has been melted. The product obtained has an improved opacity.

EXAMPLES 14-15

Preparation of substrate for impregnation to make laminated panels

Example 14 (prepared by a conventional technique of the prior art) and Example 15 (prepared by the process of the invention with a micronized vegetable filler) were carried out to give a kraft substrate intended for subsequent impregnation with a phenolic resin for the preparation of laminated panels.

The fundamental properties desired for such a substrate are: uniform formation of the fibrous sheet material and appropriate porosity and capillary rise for the most uniform resin pick-up possible at the desired level, having regard to the properties required for laminated panels.

The composition of the ingredients and the procedures for obtaining the sheets of Example 14 (control) and Example 15 (according to the invention) are collated in Table XI below. The properties of the corresponding sheets obtained are shown in Table XII below.

The numerical values given in Tables XI and XII clearly show the advantages brought by using the micronized vegetable filler according to the invention, namely:

the distinct improvement in the bulk (+18% when comparing the product of Example 15 with the control of Example 14);

the replacement of the absorbent fibers (junkers fibers), which are expensive, with conventional softwood fibers, on the one hand, and with the vegetable filler, on the other, both of hwich are less expensive than the said absorbent fibers; and the possibility of using less refined fibers (freeness of 30° SR for the fibers of Example 15 instead of 26° SR for the fibers of Example 14).

When comparing the product of Example 15 with the control sheet of Example 14, these advantages afford an appreciable increase in productivity in terms of (i) the production of the substrate for impregnation on the paper machine (in view of the improved drainage), and (ii) the impregnation device when the phenolic resin is applied.

In brief, according to the invention, it is found that the cost of preparing the sheet 15 is at least 15% less than that of the sheet 14.

TABLE XI

| Composition | Ex. 14 * | Ex. 15 ** |
|---|---|---|
| Basic mixture (a) | | |
| 1) Unbleached softwood kraft pulp | 65 | 80 |
| 2) Junkers pulp (absorbent grade) | 35 | 0 |
| Freeness (°SR) for (1 + 2) | 26° SR | 30° SR |
| 3) Vegetable filler (based on maritime pine) (b) | 0 | 20 |
| Additives (c) | | |
| Native starch (d) | 0 | 1 |

TABLE XI-continued

| Composition | Ex. 14 * | Ex. 15 ** |
|---|---|---|
| Cationic flocculant (e) | 0 | 0.03 |

Notes
* conventional formulation according to the prior art;
** Example according to the invention;
(a) amounts introduced, expressed in parts by weight;
(b) particle size: $d_{95} < 100$ micrometers, $d_{80} > 10$ micrometers, moisture content less than 15% before introduction into the aqueous suspension of fibers;
(c) additives introduced into the mass [amounts expressed in parts by weight per 100 parts of basic mixture $(1 + 2 + 3 = 100)$];
(d) for coating the vegetable filler;
(e) polyethyleneimine.

TABLE XII

| Properties | Ex. 14 * | Ex. 15 ** |
|---|---|---|
| Weight (g/m²) | 181 | 180 |
| Thickness (a) | 285 | 335 |
| Bulk (cm³/g) | 1.57 | 1.86 |
| Bendtsen porosity (ml/min) | 590 | 850 |
| Breaking length (m) | 4980 | 4890 |
| Burst factor (kPa · m²/g) | 3.78 | 3.60 |
| Tear factor (mN · m²/g) | 1470 | 1480 |
| 5 mm capillary rise (in minutes) | 25.2 | 38 |
| Water drop (s) | | |
| recto | 5.0 | 2.0 |
| verso | 4.5 | 2.5 |
| Retention (%) vegetable filler | — | 79 |

Notes
* conventional formulation according to the prior art;
** Example according to the invention;
(a) in micrometers.

EXAMPLES 16-17

Preparation of kraft liner

Example 16 (prepared by a conventional technique of the prior art) and Example 17 (prepared by the process of the invention with a micronized vegetable filler) were carried out to give a sheet of kraft liner. The aim was to increase the bulk while at the same time preserving the physical properties of the control sheet of Example 16.

The composition of the ingredients and the procedures for obtaining the sheets of Example 16 (control) and Example 17 (according to the invention) are collated in Table XIII below. The properties of the corresponding sheets obtained are shown in Table XIV below.

The numerical values given in Tables XIII and XIV show that the sheet of Example 17 exhibits a 12% improvement in the bulk with a 5% reduction in the bursting strength. This reduction in strength can be mitigated (taking into account the wide tolerance of the porosity of the fibrous sheet product of Example 17) by means of a small increase in the °SR of the fibers.

TABLE XIII

| Composition | Ex. 16 * | Ex. 17 ** |
|---|---|---|
| Basic mixture (a) | | |
| 1) Unbleached softwood kraft pulp refined to 20° SR | 75 | 60 |
| 2) Waste paper pulp (OCC) | 25 | 25 |
| 3) Vegetable filler (based on maritime pine) (b) | 0 | 10 |
| Additives (c) | | |
| Starch | 0 | 1.1 |
| Cationic flocculant (e) | ·0 | 0.02 |
| Size (f) | 0.6 | 0.6 |
| Alum | (g) | (g) |

Notes
* conventional formulation according to the prior art;
** Example according to the invention;
(a) amounts introduced, expressed in parts by weight;
(b) particle size: $d_{95} < 100$ micrometers, $d_{80} > 10$ micrometers, moisture content < 15% before introduction of the basic mixture into the aqueous suspension of fibers, density = 195 kg/m³;
(c) additives introduced into the mass [amounts expressed in parts by weight per 100 parts of basic mixture $(1 + 2 + 3 + 4 = 100)$], density 195 kg/m³, $d_{95} < 100$ micrometers;
(e) polyethyleneimine;
(f) rosin emulsion;
(g) amount sufficient for pH 4.5-5.0.

TABLE XIV

| Properties | Ex. 16 * | Ex. 17 ** |
|---|---|---|
| Weight (g/m²) | 152 | 151 |
| Thickness (a) | 238 | 266 |
| Bulk (cm³/g) | 1.56 | 1.76 |
| Bendtsen porosity (ml/min) | 500 | 1000 |
| Breaking length (m) | 4670 | 4595 |
| Burst factor (kPa · m²/g) | 3.82 | 3.65 |
| Tear factor (mN · m²/g) | 1570 | 1480 |
| Sizing (Cobb) at 60 s (g/m²) | | |
| recto | 20.2 | 20.2 |
| verso | 24.8 | 21.8 |
| Retention (%) | | |
| fibers | — | 97.6 |
| vegetable filler | — | 85.0 |

Notes
* conventional formulation according to the prior art;
** Example according to the invention;
(a) in micrometers.

I claim:

1. A method for the preparation of a fibrous sheet material by a paperworking technique, comprising:
   providing an aqueous dispersion containing fibers:
   producing pulverulent vegetable filler by a grinding-micronization operation of planings from vegetable material having a mean particle size of less than 5 mm and a residual moisture content of less than 20% by weight;
   said vegetable filler having a density of less than 500 Kg/m³ and a particle size wherein at least 95% by weight of the vegetable filler has a dimension size lower than 150 micrometers and more than 80% by weight of the vegetable filler has a dimension size larger than 10 micrometers; and
   introducing said vegetable filler into said aqueous solution.

2. A method as claimed in claim 1, wherein said vegetable filler has a density of less than 300 kg/m³.

3. A process as claimed in claim 1, wherein the said vegetable material comprising a vegetable waste selected from the group consisting of wood, bark and cereal wastes is obtained by means of a grinding-micronization operation of said vegetable waste having a mean particle size of less than 5 mm and a residual moisture content of less than 20%.

4. A method as claimed in claim 1, wherein said vegetable material comprises a vegetable waste having a residual moisture content of less than 15%.

5. A method as claimed in claim 1, wherein at least 95% of the particles of said vegetable filler have dimensions smaller than 100 micrometers.

* * * * *